United States Patent [19]

Strandskov

[11] 3,751,264

[45] Aug. 7, 1973

[54] PRESERVATION OF BEER

[75] Inventor: Frede B. Strandskov, North Caldwell, N.J.

[73] Assignee: The F. & M. Schaefer Brewing Company, Brooklyn, N.Y.

[22] Filed: July 13, 1971

[21] Appl. No.: 162,257

[52] U.S. Cl............... 99/48, 99/150 R, 99/224
[51] Int. Cl.............................. C12h 1/00
[58] Field of Search............... 99/48, 211, 224, 99/150

[56] References Cited
UNITED STATES PATENTS

| 3,496,209 | 2/1970 | Boudakian | 99/224 X |
| 3,198,636 | 8/1965 | Bouthilet | 99/35 |
| 3,389,999 | 6/1968 | Strandskov | 99/48 |

OTHER PUBLICATIONS

Loncin, et al., n–Octyl Galate, A New Beer Microbiological Inhibitor, A.S.B.C. Proceedings Annual Meeting, May 1970 (pp. 89–101).

Primary Examiner—David M. Naff
Attorney—E. F. Wenderoth et al.

[57] ABSTRACT

Undesirable microbial growth in beverages, particularly in malt beverages is prevented by serially admixing with the beverage A. a compound of the formula

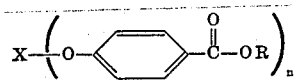

wherein X is hydrogen, alkali metal or alkaline earth metal,
$n$ is an integer equal to the valence of X, and
R is a heptyl radical,
and
B. pyrocarbonic acid diethyl ester.

8 Claims, No Drawings

PRESERVATION OF BEER

The present invention is based upon the discovery that beverages, and in particular malt beverages, e.g., beer and ale, can be effectively preserved against undesirable microbial growth by serially incorporating therein heptyl prahydroxybenzoate or a salt thereof and pyrocarbonic acid diethyl ester (diethyl pyrocarbonate or DEPC).

In the instant specification and claims the term "malt beverages" is intended to include fermented alcoholic beverages produced utilizing barley malt and includes beer, ale, malt liquor, stout and porter.

The invention is particularly concerned with the preservation of finished packaged beer and ale against undesirable microbial growth by serially adding the enumerated materials.

It is desired by the brewing industry to eliminate the necessity for the pasteurization and/or refrigeration of packaged malt beverages. This desire is due to both deleterious effects of the pasteurization on the properties of the beer as well as to the savings in cost per unit of production which can be realized.

It is known that malt beverages can be preserved against microbial growth and spoilage prevented by addition to the finished beverage of the heptyl or octyl esters of parahydroxybenzoic acid or alkali metal or alkaline earth metal salts thereof. See U.S. Pat. No. 3,175,912. The discovery of the use of these compounds in preserving beer has represented a great advance in the brewing industry and has provided a means by which the disadvantages attendant upon the pasteurization and/or refrigeration of the beverage are avoided.

Diethyl pyrocarbonate (DEPC) is known to be useful in the preservation of perishable materials. See U.S. Pat. No. 2,910,400. Also known are systems for the injection of DEPC into a flowing stream of a beverage to be preserved. See U.S. Pat. No. 3,506,460. Also see published West German pending application No. 1432368 which was laid open for inspection Dec. 19, 1968.

The present invention is based upon the discovery that the preservation of malt beverages can be achieved by serially adding to the beverage DEPC and heptyl or octyl parahydroxybenzoate or a salt thereof. The use of the combination of the additives makes it possible to obtain the preservation of the malt beverage without the necessity of pasteurization while avoiding or minimizing any undesirable effects flowing from the individual use of the components.

In accordance with the invention, the malt beverage is preserved by serially incorporating therein
A. a compound of the formula

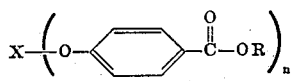

wherein X represents hydrogen, alkali metal (e.g., sodium, potassium, etc.) or alkaline earth metal (e.g., calcium),
n is an integer equal to the valence of X, and
R represents a heptyl radical (e.g., n-heptyl);
and
B. diethyl pyrocarbonate.

The preservation of malt beverages with DEPC alone or with the parahydroxybenzoate ester alone is sometimes not feasible because, inter alia, the comparatively large amount of the materials necessary to achieve preservation for a satisfactory length of time can have a tendency to create adverse effects upon the quality of the finished product.

It is a critical aspect of this invention that the incorporation of the preservative components be accomplished serially. If the preservative materials or solutions thereof are combined and the mixture then added to the beverage an unacceptable product is obtained both from the standpoint of appearance and degree of preservation. For example, when n-heptyl parahydroxybenzoate and DEPC are dissolved in anhydrous ethanol and the mixture subsequently added to beer, a hazy product results which is commercially unacceptable.

It does not appear to be particularly critical which of the components is added to the beverage first and the choice can therefore be made based upon convenience of operation.

The additives are incorporated into the beverage at any time during the prepartion, provided that they will not interfere with the subsequent processing and provided that further processing will not interfere with their preservative effectiveness. By way of illustration, it is advantageous to add the materials to finished beer. The term "finished" beer herein refers to beer which contains all of the necessary additives to make it a commerically acceptable product and which has been subjected to polish filtration.

In general, the benzoate component is added to the beverage in the form of a stock solution wherein the ester is dissolved in a solvent which is not deleterious to the beverage. This may be for example, propylene glycol, ethanol, an aqueous alkaline solution or the like. The DEPC can be added as such or as a solvent solution where the solvent has no adverse effect on the material itself or upon the beverage, e.g., absolute ethanol.

In commercial operations, the components will, in general, be added to a flowing stream of the beverage. The technology for achieving the addition is known and forms no part of this invention. With respect to the introduction of the benzoate see "The Practical Application of the STAYPRO–WS–7 Process to Beer Packaging," F. B. Strandskov, C. Hanft and J. B. Bockelmann, Wallerstein Laboratories Communications, Volume XXXI, No. 105, August, 1968. Illustrative of the addition of DEPC into the beverage is a system wherein the additive is forced into the beverage from a pressurized container through nozzles mounted on the pipe carrying the flowing beverage stream. Automatic control systems for injection systems are known to the art-skilled.

The amount of benzoate ester component used will vary with the type of beverage employed and upon the degree of preservation desired. The amount will be below that necessary to achieve effective preservation of the beverage when used alone. In general, the amount will range from about 8 to about 10 parts of ester per million parts of beverage. The amount of DEPC will likewise vary with the type of beverage and the degree of preservation. The amount will fall well below that necessary to achieve preservation when used alone and will range from above about 10 to about 50 parts per million parts of beverage.

The invention also provides the preserved beverage compositions produced by the herein described process. These compositions possess commercially valuable characteristics and characteristics which are distinct from compositions which have, for example, been prepared by forming a mixture of the herein described preservative components and adding such mixture to the beverage.

From the foregoing description it is apparent that the preservative components used herein can be employed to preserve beverages which contain other chemical additives to improve the characteristics thereof, e.g., foam and chill haze improvers and the like. As illustrative it is noted that the components can be used with beer containing a propylene glycol alginate such as Kelcoloid-O and Kelcoloid-L.

The invention is applicable to all forms of packaged beverages, e.g., cartons, bottles, cans, kegs or tank trucks and is also applicable to concentrated and reconstituted beverages.

Throughout the entire disclosure the relationship between parts by weight and parts by volume is the same as that between grams (g.) and milliliters (ml.). Parts per million (ppm.) are uniformly parts by weight of additament per million parts by volume of finished product.

The examples set forth herein are purely illustrative of the invention and not exhaustive or limitative thereof.

From the regular production line fill each of three, clean 12 ounce (oz.) brown beer bottles with 12 oz. of cold, unpasteurized finished beer into which no microbiological preservative has been incorporated. Foam up the beer to expel head space air, and cap. Each of these bottles contains 350 ml. of unpasteurized lager beer. These bottles are utilized as the control in the Examples. Store these bottles at room temperature (about 15° to 30°C). At the end of 3, 16 and 20 weeks, respectively, the bottles are examined for the development of sediment.

STOCK SOLUTIONS

Various stock solutions are prepared as hereinafter disclosed for use in the examples. The stock solution numbers conform to the corresponding example number.

STOCK SOLUTION NO. I

Dissolve 420 milligrams (mgms) of n-heptyl parahydroxybenzoic acid in a sufficient amount of ethanol to make 100 milliliters (ml.) of solution. The addition of 0.5 ml. of this solution, containing 2.1 mgms. of the n-heptyl parahydroxybenzoate, to 350 ml. of beer yields a solution containing 6 ppm of the benzoate.

STOCK SOLUTION NO. V

Dissolve 700 mgms. of DEPC in a sufficient amount of absolute ethanol to make 100 ml. of solution. The addition of 0.5 ml. of this solution, containing 3.5 mgms. of the DEPC, to 350 ml. of beer yields a solution containing 10 ppm of the DEPC.

STOCK SOLUTIONS II – IV AND VI – IX

In the same manner as for Stock Solutions I and V, additional solutions are made up such that 0.5 ml. of the solution added to 350 ml. of beer yields a solution containing the amounts of materials indicated below.

| STOCK SOLUTION | ADDITIVE AND AMOUNT (ppm) |
|---|---|
| II | 8 n-heptyl p-hydroxybenzoate |
| III | 10 n-heptyl p-hydroxybenzoate |
| IV | 12 n-heptyl p-hydroxybenzoate |
| VI | 20 DEPC |
| VII | 50 DEPC |
| VIII | 100 DEPC |
| IX | 200 DEPC |

EXAMPLE 1

Into each of three, 12 oz. brown beer bottles place 0.5 ml. of Stock Solution No. I. Fill these bottles from the regular production line with cold, unpasteurized beer containing no chemical preservative. Foam up the beer to expel headspace air, and cap. Each of these bottles contains 350 ml. of the beer together with the stock solution. Store these bottles at room temperature (about 15° to 30°C). At the end of 3, 16 and 20 weeks, respectively, the bottles are examined for the development of sediment. Spoilage may be readily observed by a marked amount of sediment in the beer.

EXAMPLE 2

Into each of three, 12 oz. brown beer bottles, place 0.5 ml. of Stock Solution No. II. Fill these bottles from the regular production line with cold, unpasteurized beer containing no chemical preservative. Foam up the beer to expel headspace air, and cap. Each of these bottles contains 350 ml. of the beer together with the stock solution. Store these bottles at room temperature (about 15° to 30°C). At the end of 3, 16 and 20 weeks, respectively, the bottles are examined for the development of sediment.

EXAMPLE 3

Into each of three, 12 oz. brown beer bottles place 0.5 ml. of Stock Solution No. III. Fill these bottles from the regular production line with cold, unpasteurized beer containing no chemical preservative. Foam up the beer to expel headspace air, and cap. Each of these bottles contains 350 ml. of the beer together with the stock solution. Store these bottles at room temperature (about 15° to 30°C). At the end of 3, 16 and 20 weeks, respectively, the bottles are examined for the development of sediment.

EXAMPLES 4 TO 18

The same procedure is followed as in the preceding Examples using Stock Solutions IV through IX. In the Examples where a combination of the preservatives is employed, these are added serially by introducing the benzoate-containing stock solution into the bottle, filling the bottle with beer and subsequently adding the DEPC-containing solution and mixing.

The following table sets forth the results obtained in the examples.

| Example | n-Heptyl p-hydroxy-benzoate (p.p.m.) | DEPC (p.p.m.) | Sediment reading [1] after— | | | | | | | | |
|---|---|---|---|---|---|---|---|---|---|---|---|
| | | | 3 weeks | | | 16 weeks | | | 20 weeks | | |
| Control | 0 | 0 | 9+ | 9+ | 9+ | 9+ | 9+ | 9+ | 9+ | 9+ | 9+ |
| 1 | 6 | 0 | 6 | 6 | 7 | 9+ | 9+ | 9+ | 9+ | 9+ | 9+ |
| 2 | 8 | 0 | 4 | 4 | 4 | 9+ | 9+ | 9+ | 9+ | 9+ | 9+ |
| 3 | 10 | 0 | 2 | 2 | 2 | 3 | 4 | 9+ | 9+ | 9+ | 9+ |
| 4 | 12 | 0 | 1 | 1 | 2 | 2 | 3 | 4 | 3 | 3 | 4 |
| 5 | 0 | 50 | 9+ | 9+ | 9+ | 9+ | 9+ | 9+ | 9+ | 9+ | 9+ |
| 6 | 0 | 100 | 9+ | 9+ | 9+ | 9+ | 9+ | 9+ | 9+ | 9+ | 9+ |
| 7 | 0 | 200 | 9+ | 9+ | 9+ | 9+ | 9+ | 9+ | 9+ | 9+ | 9+ |
| 8 | 6 | 10 | 5 | 6 | 6 | 9+ | 9+ | 9+ | 5 | 9+ | 9+ |
| 9 | 8 | 10 | 2 | 3 | 3 | 5 | 6 | 9+ | 5 | 9+ | 9+ |
| 10 | 10 | 10 | 1 | 2 | 2 | 4 | 3 | 3 | 3 | 4 | 5 |
| 11 | 6 | 20 | 6 | 7 | 7 | 9+ | 9+ | 9+ | 9+ | 9+ | 9+ |
| 12 | 8 | 20 | 2 | 3 | 5 | 6 | 4 | 5 | 5 | 3 | 5 |
| 13 | 10 | 20 | 1 | 2 | 2 | 3 | 3 | 5 | 3 | 4 | 5 |
| 14 | 12 | 20 | 1 | 1 | 2 | 2 | 3 | 4 | 3 | 3 | 4 |
| 15 | 6 | 50 | 4 | 5 | 9+ | 9+ | 9+ | 9+ | 9+ | 9+ | 9+ |
| 16 | 8 | 50 | 1 | 1 | 2 | 3 | 3 | 4 | 4 | 3 | 3 |
| 17 | 10 | 50 | 1 | 2 | 2 | 2 | 4 | 3 | 2 | 4 | 3 |
| 18 | 12 | 50 | 1 | 1 | 2 | 3 | 4 | 3 | 3 | 3 | 4 |

[1] A sediment reading of 9 or above indicates microbial spoilage.

The data of the examples reveal that a concentration of DEPC as high as 200 ppm. is not effective as a beer preservative (Examples 5 to 7). The beer containing the high level of DEPC spoils as rapidly as the control beer. The benzoate ester when used alone preserves the test beer at a concentration of 12 ppm.. However, preservation was obtained with 10 ppm. of the benzoate when as little as 10 ppm. of DEPC was added and with 8 ppm. of benzoate when 20 ppm. of DEPC was used. This is seen to represent substantial synergism when one considers that 200 ppm. DEPC is clearly inactive.

It is not entirely clear why the mixture is effective in achieving preservation when the high level of DEPC is ineffective. It can be therorized that DEPC has little or no effect on the growth of bacteria in beer. It is, however, extremely effective against yeast. The benzoate esters are much more effective against bacteria than against yeast. Thus, while it requires 12 ppm. of the benzoate to completely inhibit yeast growth, the bacterial growth may be inhibited with 8 ppm. DEPC inhibits yeast growth completely at a level of 20 ppm. and so a combination of 8 ppm. of the benzoate and 20 ppm. of DEPC gives complete protection. The data indicate that the 8 ppm. of benzoate also has a considerable effect on yeast growth and may exert an effect on the 20 ppm. of DEPC. Regardless of the accuracy of the theory, it is clear that synergism is demonstrated when considering the complete preservation.

What is claimed is:

1. A method for preserving fermented alcoholic malt beverages against undesirable microbial growth which comprises serially admixing with the unpasteurized finished beverage A. from about 8 to about 10 ppm. of a compound of the formula

wherein X is hydrogen, alkali metal or alkaline earth metal,
    n is an integer equal to the valence of X, and
    R is a heptyl radical, and B. from about 10 to about 50 ppm. of pyrocarbonic acid diethyl ester.

2. A method according to claim 1 wherein the beverage is beer.

3. A method according to claim 2 wherein the compound (A) is n-heptyl p-hydroxybenzoate.

4. A method according to claim 1 wherein the compound (A) is introduced into the beverage and permitted to mix therewith prior to introducing the pyrocarbonic acid diethyl ester.

5. A method according to claim 1 wherein compound (A) is introduced as an alkaline solution into a flowing stream of the beverage under pressure and the pyrocarbonic acid diethyl ester is subsequently added to the following beverage stream under pressure as a solution with a suitable solvent.

6. A flowing according to claim 1 wherein compound (A) is introduced as an alkaline solution into a flowing stream of the beverage under pressure and substantially pure pyrocarbonic acid diethyl ester is subsequently added to the folowing beverage stream under pressure.

7. A method for preserving beer against undesirable microbial growth which comprises 1. admixing with finished unpasteurized beer from about 8 to about 10 ppm. n-heptyl p-hydroxybenzoate and 2. subseqnetly admixing with the resultant beer about 10 to about 50 ppm. pyrocarbonic acid diethyl ester.

8. A composition which comprises unpasteurized fermented alcoholic malt beverage preserved against undesirable microfial growth by the method according to claim 1.

* * * * *